United States Patent [19]
Rogers

[11] Patent Number: 5,884,403
[45] Date of Patent: Mar. 23, 1999

[54] POWERED TREE LIMB TRIMMING DEVICE

[76] Inventor: Ronald E. Rogers, P.O. Box 175, North Branch, Mich. 48641

[21] Appl. No.: 991,756

[22] Filed: Dec. 16, 1997

[51] Int. Cl.$^6$ ..................................................... B27B 17/02
[52] U.S. Cl. ......................... 30/296.1; 30/381; 144/24.13
[58] Field of Search .................................. 30/166.3, 276, 30/296.1, 371, 381, 382, 386; 144/24.13, 343

[56] References Cited

U.S. PATENT DOCUMENTS

| | | | |
|---|---|---|---|
| 3,731,380 | 5/1973 | Mathiesen | 30/381 |
| 3,731,382 | 5/1973 | Wroe | 30/381 |
| 4,207,675 | 6/1980 | Causey et al. | 30/296.1 |
| 4,654,971 | 4/1987 | Fettes et al. | 30/296.1 |
| 4,760,646 | 8/1988 | Siegler | 30/382 |
| 4,916,818 | 4/1990 | Panek | 30/296.1 |

OTHER PUBLICATIONS

Remington 8'Electric Telecscoping Pole Saw Owner's Manual—Model RPS 96–8 pages.

*Primary Examiner*—W. Donald Bray
*Attorney, Agent, or Firm*—Reising, Ethington, Learman & McCulloch, PLLC

[57] ABSTRACT

An electric tree trimming apparatus includes an elongate telescoping tubular handle having a bracket provided on its upper end that releasably mounts and electric chain saw with the bar of the saw supported at an obtuse angle with respect to the handle. A coiled extension cord is accommodated within the handle and has a socket supported adjacent the upper end of the handle for releasable attachment to a plug of the saw, and a plug at the opposite end for connection to a power source. A remote trigger switch is mounted on the handle adjacent the lower end and is electrically coupled to the extension cord of the handle to enable remote operation of the saw.

3 Claims, 3 Drawing Sheets

POWERED TREE LIMB TRIMMING DEVICE

This application claims benefit of provisional application Ser. No. 60/035,135 filed Jan. 8, 1997.

This invention relates to extended handle tree limb trimming saws.

BACKGROUND OF THE INVENTION

It is sometimes necessary or desirable to trim the limbs of tall trees, such as when they interfere with building structures or power lines. One common approach to reaching such limbs is to climb a ladder and trim them with a hand saw or powered chain saw. However, climbing a ladder, and particularly while carrying a saw, poses a risk to the workmen.

Another approach to reaching high tree limbs is to employ an extended handle saw. Such tools typically include a fixed length or telescoping pole that serves as the handle, and mounts at its upper end a fixed saw blade. While a fixed saw blade may work well when the limbs to be trimmed are small in diameter and few in number, the task becomes tedious and burdensome when the limbs to be trimmed are large in size or in number.

SUMMARY OF THE INVENTION

An electric tree limb trimming apparatus includes an elongate telescoping handle having upper and lower ends. A mounting bracket is provided on the upper end and releasably mounts an electric chainsaw. A remote switch is mounted on the handle adjacent its lower end and is coupled electrically to the saw to enable remote operation of the saw.

The invention advantageously provides an extended handle electric chainsaw to reduce the time and effort required to trim high limbs of trees. The remote switch enables the saw to be operated while standing on the ground, eliminating the need to climb a ladder to access the limbs and operate the saw. The mounting bracket enables the saw to be dismounted from the handle, allowing it to be used in the usual manner when desired.

According to further features of a preferred embodiment, a coiled power cord is provided within the handle and has a socket end supported adjacent the upper end of the handle into which a plug of the saw is connected, and a plug end supported adjacent the lower end for connection with a power source or extension cord. The coiled nature of the cord enables it to elongate and contract in length, with the lengthening and shortening of the telescoping handle.

According to still a further preferred feature, the mounting bracket supports the cutting bar of the saw at an obtuse angle with respect to the handle. This angular relationship between the saw and handle presents the cutting bar to a limb at a generally upward angle to minimize binding during cutting.

THE DRAWINGS

A presently preferred embodiment of the invention is disclosed in the following detailed description and in the accompanying drawings, wherein.

DETAILED DESCRIPTION

Figure 1:
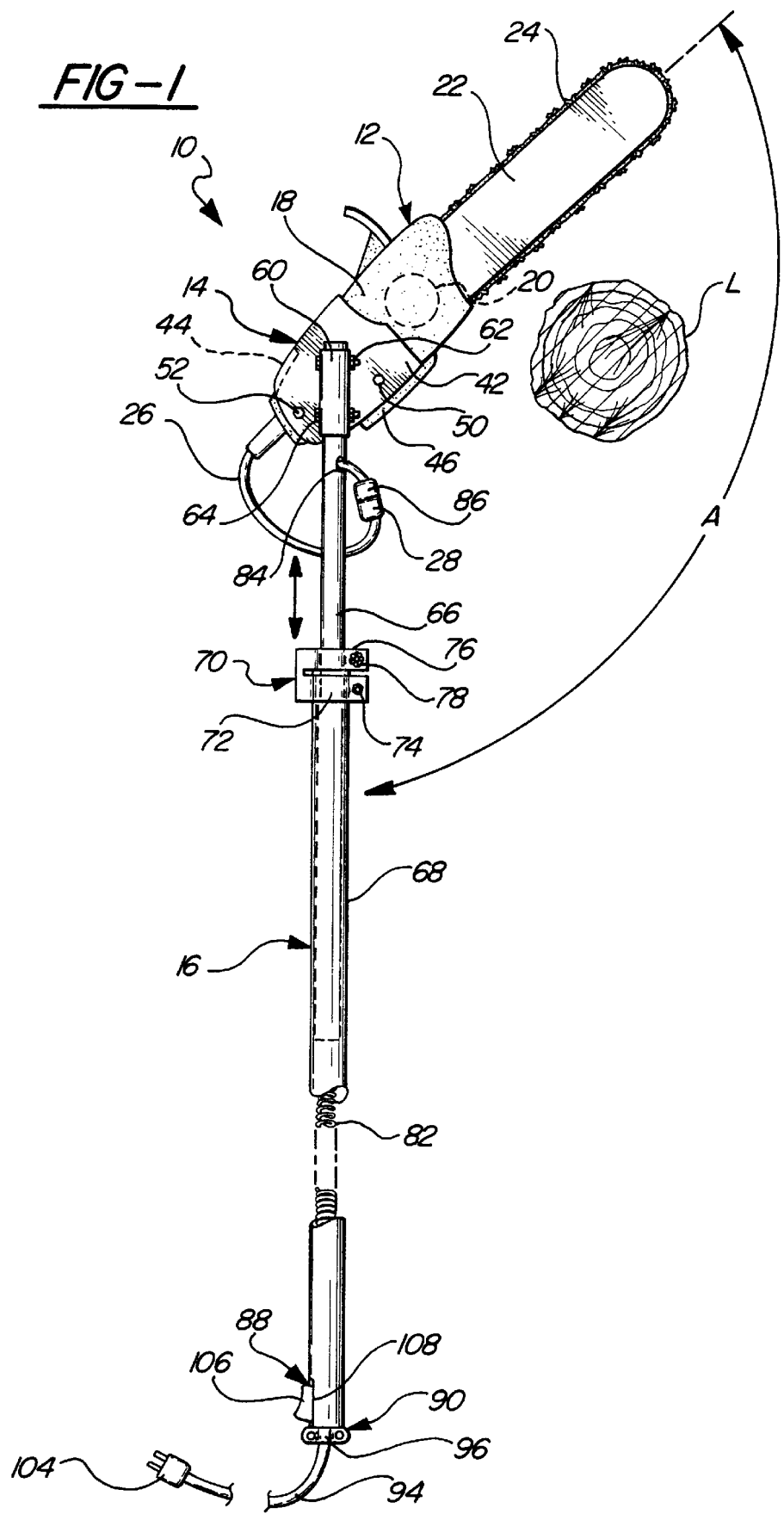
FIG. 1 is a fragmentary elevation view of an apparatus constructed according to a presently preferred embodiment of the invention.

A tree limb trimming device or electric telescoping pole saw constructed in accordance with the presently preferred embodiment of the invention is shown in FIG. 1 and designated generally by the reference numeral 10. The device 10 includes a conventional electrically powered chain saw 12 mounted by a bracket 14 to one end of a telescoping handle or pole assembly 16.

The saw 12 is preferably a conventional electric chain saw and may comprise any of a number of saws available on the market such as, for example, a Remington 1.25 HP 12-inch cut. The saw 12 includes a plastic casing 18 which houses an electric motor 20 and mounts an elongate bar 22 extending forwardly of the casing 18. A chain 24 is trained about the bar 22 and is drivingly coupled to the motor 20 by a sprocket (not shown) in a conventional manner.

An electrical power cord 26 extends from the casing 18 and carries a plug 28 at its free end. The cord 26 is wired to the motor 20 through a trigger switch 30 projecting from a handle 32 of the casing. As is conventional, the trigger 30 is normally biased outwardly of the handle 32 to open the circuit between the power supply and the motor 20, but is operable when the trigger 30 is depressed 20, but is operable when the trigger 30 is depressed to complete the circuit.

Figure 4:
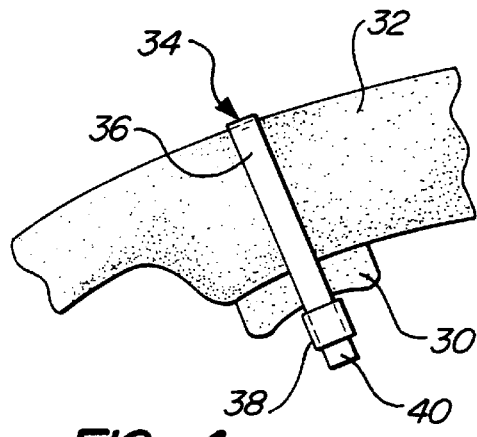
FIG. 4 is an enlarged fragmentary view of the handle and trigger switch region of the saw.

According to the present invention, the trigger switch 30 is disabled by a lock device 34 such that the circuit remains closed at all times between the cord 26 and motor 20. FIG. 4 illustrates the preferred way of disabling the switch 30. As shown, a plastic band or tie 34 encircles the handle 32 and trigger 30 to hold the trigger 30 in the fully depressed condition. The tie 34 may be of the conventional type having a plastic strap 36 anchored at one end to a lock body 38 and having its opposite free end 40 extendible through a slot in the body 38 where it is gripped by a one-way locking mechanism to prevent the withdrawal of the free end 40.

The bracket 14 is best shown in FIGS. 13 and comprises a pair of laterally spaced, parallel metal side plates 42 joined along their rearward top edges by a metal cross plate 44. The casing 18 of the saw 12 is received in the space between the plates 42 from below. A bottom guard plate 46, supplied by the saw manufacturer, of the casing 18 extends laterally outwardly of the casing and confronts the lower edge of the associated side plate 42 when the saw 12 is fully accommodated in the bracket 14.

The guard plate 46 supplied with the saw is trimmed somewhat at the back of the casing to accommodate the handle 16. As shown, the plate 46 is modified to terminate at a rearward edge 48 located forwardly of the handle 16. The saw 12 is otherwise unmodified.

The top plate 44 of the bracket 14 confronts the top surface of the handle 32 of the casing 18 and may be padded to minimize marring of the casing 18. Fasteners 50,52 extend through associated aligned openings 54,56 in the side plates 42 and pass through the open handle region 58 of the casing 18. When tightened, the fasteners 50,52 draw the side plates 42 toward one another and clamp the casing 18 between the side plates 42 to secure the saw 12 in fixed relation to the bracket 14.

A metal tubular sleeve 60 is suitably fixed, such as by welding, to one of the side plates 42 and is open at its ends to accommodate the upper end of the extension handle 16. Fasteners 62,64 extend through aligned openings in the sleeve 60 and handle 16 to fix the bracket 14 immovably to the handle 16. As shown best in FIGS. 1 and 2, the sleeve 60 is fixed to the bracket 14 in such relation that the bar 22 of the saw 12 is set at a fixed obtuse angle A (FIG. 1) with respect to a longitudinal axis of the handle 16. The angle is in the range of about 140°–160° and preferably about 150°. This angular relationship between the bar 22 and handle 16 prevents the chain 24 from binding while cutting a tree limb.

The handle 16 has an upper tubular pole section 66 slideably accommodated in a lower tubular pole section 68. Each section preferably is composed of a lightweight, strong, electrically insulating material such as fiberglass. A lower band 70 of a length adjustment clamp or adjustable coupling clamp 72 is secured by a fastener 74 to the upper free end of the lower handle section 68. An integral upper band section 76 extends about the upper handle section 66 and carries a hand-tightenable fastener 78 operable to clamp and release the upper section 66 and secure the upper section 66 in any selected position of extension with respect to the lower section 68 and enable a user to adjust the overall effective length of the handle 16.

Figure 2:
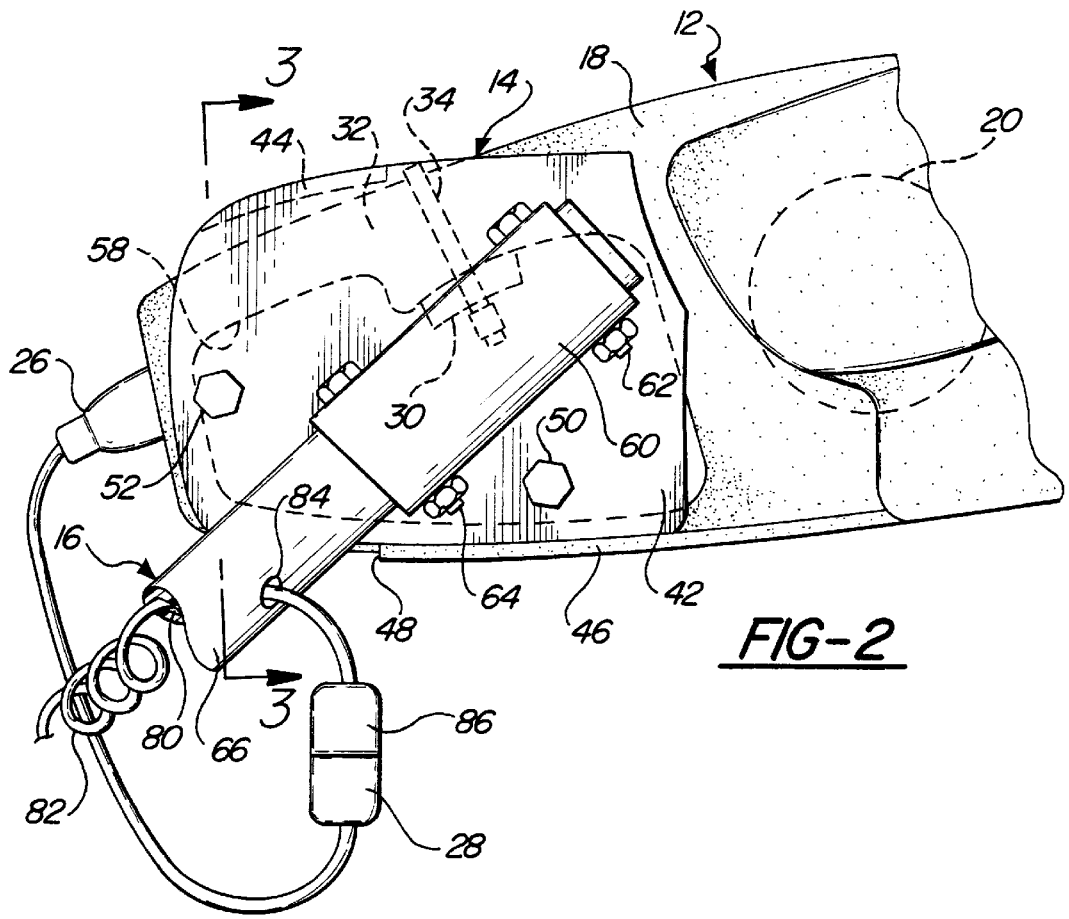
FIG. 2 is an enlarged fragmentary elevation view showing the connection between the saw and handle.
Figure 3:
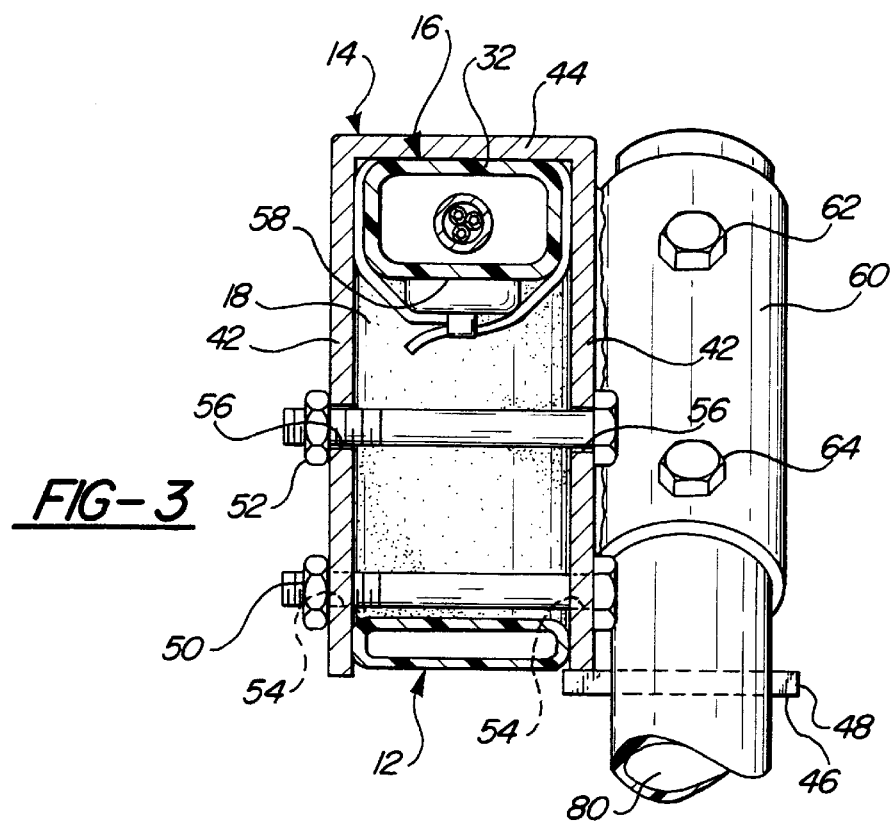
FIG. 3 is a fragmentary cross-sectional view taken along the lines 3—3 of FIG. 2.
Figure 6:
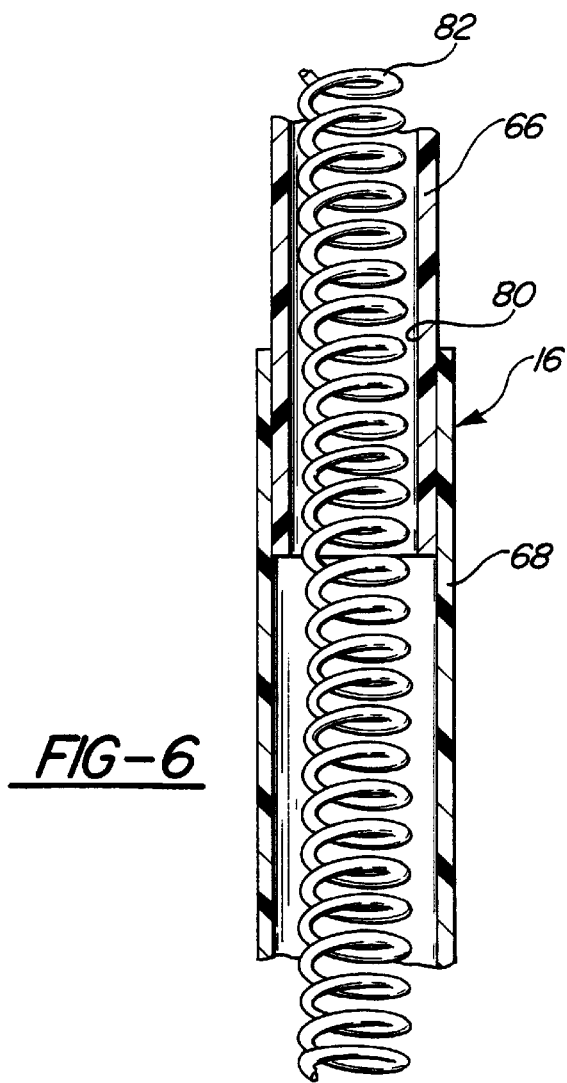
FIG. 6 is an enlarged fragmentary sectional view of the handle illustrating the telescoping handle and coiled power cord features.

The sections 66,68 provide a longitudinal passage 80 in which a coiled, springy electric power or extension cord 82 is housed internally of the handle 16 (see FIG. 6). The cord 82 extends through an opening 84 in the upper section 66 adjacent the sleeve 60 and mounts a socket or receptacle 86 at its free end which, as shown in FIGS. 1 and 2, is coupled to the plug 28 of the saw cord 26. The socket 86 effectively fixes the upper end of the extension cord 82 with respect to the upper handle section 66.

Figure 5:
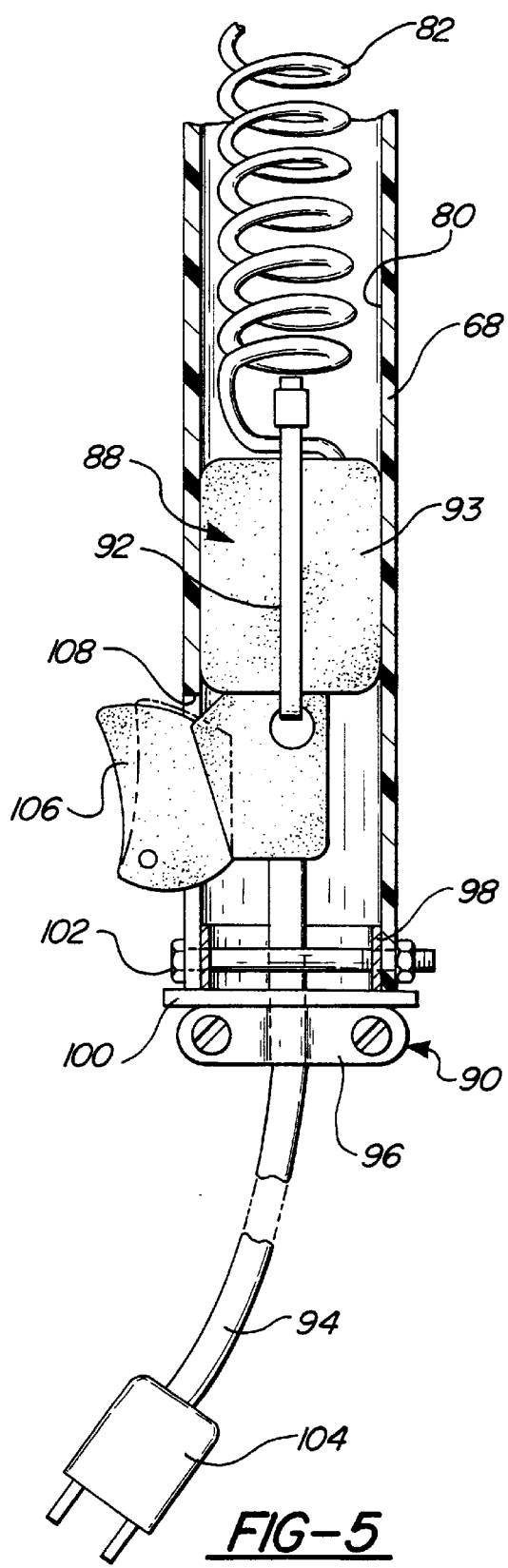
FIG. 5 is an enlarged fragmentary cross-sectional view of the lower region of the handle showing details of the internal power cord and remote switch.

The internal extension cord 82 is coupled at its lower end to a switch 88 fixed by means of a clamp 90 internally within the handle 16 adjacent the lower free end of the lower handle section 68, as illustrated best in FIG. 5. A tie 92 like the tie 34 described above may be wrapped about the lower end of the cord 82 and around the body 93 of the switch 88 to absorb forces that would act to pull the cord 82 away from the switch 88 (such as when extending the handle 16).

An external section 94 of the electric extension cord 82 is coupled to the switch 88 and fixed tightly by a bracket 96 of the clamp 90 to secure the external section 94 and the switch 88 from sliding longitudinally relative to the clamp 90. A plug 104 is provided at the free end of the external section 94 for connection to an electrical outlet (not shown). The clamp 90 has a cylindrical portion 98 accommodated within the open end of the lower handle section 68 and an external handle section 68. A fastener 102 extends through aligned openings in the lower section 68 and the cylindrical portion 98 of the clamp 90 to secure the clamp 90 and thus the switch 88 against movement relative to the lower end of handle section 68. In this way the internal coiled extension cord 82 is anchored at its opposite ends by the plug 86 and the switch 88 respectively. A sufficient length of the extension cord 82 is provided to accommodate the full range of adjustment in the length of the handle 16. As the upper section 66 is extended from the lower section 68, the cord 82 extends with the handle 16 by uncoiling as necessary and then recoiling to its shortened condition as the handle 16 is shortened in length.

A trigger 106 of the switch 88 extends through an open slot 108 through the lower handle section 68 and is movable from the solid line position to the broken chain line position shown in FIG. 5 for closing the switch and completing the circuit from the external extension cord 94 to the internal extension cord 88 and the motor 20.

THE OPERATION

In use, the user connects the plug 104 of the external extension cord 94 to an electrical outlet socket. The handle 16 is adjusted to provide outlet socket. The handle 16 is adjusted to provide sufficient length to enable the user to reach an elevated tree limb L with the bar 22 of the saw 12 while standing on the ground or a ladder and grasping the lower section 68 of the handle 16. With the bar 22 positioned above the limb L, the user may depress the trigger 106 which energizes the motor 20 and causes the chain 24 to orbit about the bar 22. The user may then lower the bar 22 into engagement with the limb L allowing the chain 24 to cut through the limb in the conventional manner. Once the limb L is cut, the user releases the trigger 106 which returns outwardly to its open circuit position to interrupt power to the motor 20. The handle 16 may then be readjusted as necessary and the steps repeated to cut additional tree limbs.

The disclosed embodiment is representative of a presently preferred form of the invention, but is intended to be illustrative rather than definitive thereof. The invention is defined in the claims.

I claim:

1. An electric telescoping pole saw, comprising:
   an electric chain saw having a handle, a trigger, and a power cord;
   a telescoping pole assembly having telescoping tubular sections extending between an upper end and a lower end of said pole and including an adjustable coupling clamp operative when loosened to enable said sections to telescope relative to one another for adjusting the effective length of said pole and operative when tightened to secure said sections in a selected position of adjustment;
   a bracket provided on said upper end of said pole for receiving said handle of said saw and mounting saw releasably on said pole adjacent said upper end thereof;
   a trigger depression device operative to support said trigger of said saw in a depressed "on" position;
   an adjustable length extension cord accommodated within said telescoping pole having an end extending from said upper end of said pole connectable releasably with said power cord of said saw, and an opposite end extending from said lower end connectable to an electrical power source; and
   a remote switch mounted on said pole adjacent said lower end thereof and coupled electrically to said extension cord and operative when depressed to transmit electrical power to said saw to operate said saw and operative when released to discontinue power and operation of said saw.

2. A telescoping pole assembly for an electrical chain saw comprising:
   telescoping tubular sections extending between an upper end and a lower end of said pole assembly and including an adjustable coupling clamp operative when loosened to enable said sections to telescope relative to one another for adjusting the effective length of said pole assembly and operative when tightened to secure said sections in a selected position of adjustment;
   a bracket provided on said upper end of said pole for receiving a handle of an electric chain saw and mounting saw releasably on said pole adjacent said upper end thereof;

a trigger depression device operative to support and maintain the saw trigger in a depressed "on" position;

an adjustable length extension cord accommodated within said telescoping pole having an end extending from said upper end of said pole assembly connectable releasably with a power cord of the saw, and an opposite end extending from said lower end connectable to an electrical power source; and a remote switch mounted on said pole assembly adjacent said lower end thereof and coupled electrically to said extension cord and operative when depressed to transmit electrical power to the saw to operate the saw and operative when released to discontinue power and operation of the saw.

3. A method of supporting an electric chain saw having a handle, a trigger and a power cord to enable a user to trim tree branches, said method comprising:

mounting the handle of the saw on a bracket secured to an upper end of a telescoping pole assembly having telescoping tubular pole sections;

securing the trigger of the saw in a depressed "on" position;

connecting the power cord of the saw to one end of an adjustable length power cord accommodated within said telescoping sections of said pole assembly and extendible and retractable in length with said pole sections;

connecting an opposite end of the adjustable length power cord to a source of electrical power; and selectively operating the saw by depressing a remote trigger mounted on the pole assembly adjacent the lower end thereof to transmit electrical power to the saw, and discontinuing operation of the saw by releasing the remote trigger to disrupt the flow of power to the saw.

* * * * *

UNITED STATES PATENT AND TRADEMARK OFFICE
CERTIFICATE OF CORRECTION

PATENT NO. : 5,884,403
DATED : March 23, 1999
INVENTOR(S) : Ronald E. Rogers

It is certified that error appears in the above-indentified patent and that said Letters Patent is hereby corrected as shown below:

Column 2, line 44, "13" should be -- 1-3 --.

Signed and Sealed this

Twentieth Day of July, 1999

Attest:

Attesting Officer

Q. TODD DICKINSON

Acting Commissioner of Patents and Trademarks